United States Patent
Hakamada

(10) Patent No.: US 7,327,498 B2
(45) Date of Patent: Feb. 5, 2008

(54) IMAGE READER FOR USE IN IMAGE FORMING APPARATUS

(75) Inventor: Susumu Hakamada, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 959 days.

(21) Appl. No.: 10/354,045

(22) Filed: Jan. 30, 2003

(65) Prior Publication Data

US 2004/0160651 A1 Aug. 19, 2004

(51) Int. Cl.
*H04N 1/04* (2006.01)

(52) U.S. Cl. .......... 358/474; 358/475; 358/509; 358/520; 382/274; 250/208.1

(58) Field of Classification Search ........ 358/474, 358/475, 509, 501, 3.22, 3.26, 3.27, 518, 358/483, 514, 512, 516, 505, 520; 382/270, 382/312, 318, 274; 250/208.1
See application file for complete search history.

(56) References Cited

U.S. PATENT DOCUMENTS

| | | | |
|---|---|---|---|
| 6,704,124 B2* | 3/2004 | Hu et al. ............... | 358/473 |
| 6,741,373 B1* | 5/2004 | Chizawa ................ | 358/475 |
| 6,744,541 B1* | 6/2004 | Lu ......................... | 358/497 |
| 6,757,083 B1* | 6/2004 | Nakamura ............. | 358/487 |
| 6,809,844 B1* | 10/2004 | Chen ...................... | 358/474 |
| 6,906,830 B1* | 6/2005 | Hayashi ................. | 358/474 |
| 6,924,911 B1* | 8/2005 | Ford et al. ............. | 358/506 |
| 6,958,835 B2* | 10/2005 | Sakakibara et al. .... | 358/514 |
| 7,190,493 B2* | 3/2007 | Maki et al. ............ | 358/461 |
| 7,224,483 B2* | 5/2007 | Hanabusa et al. ...... | 358/1.6 |

FOREIGN PATENT DOCUMENTS

| | | | |
|---|---|---|---|
| JP | 8-214117 A | | 8/1996 |
| JP | 2001-144900 A | | 5/2001 |

* cited by examiner

*Primary Examiner*—Douglas Q. Tran
*Assistant Examiner*—Negussie Worku
(74) *Attorney, Agent, or Firm*—Foley & Lardner LLP

(57) ABSTRACT

An image reader according to the present invention can change the wavelength of the light radiated from an illumination unit, by switching illumination lamps to radiate a light, so that the light has the wavelength suitable for a color image CCD sensor, when a reading object includes a color image. Therefore, a suitable image signal can be obtained irrespectively of the color of a reading object.

3 Claims, 4 Drawing Sheets

IMAGE READER FOR USE IN IMAGE FORMING APPARATUS

BACKGROUND OF THE INVENTION

The present invention relates to an image reader to obtain image data for an electrophotographic image forming apparatus, for example, and an image forming apparatus having the image reader.

An image reader converts the reflected light obtained by illuminating a reading object such as a sheet-like document, book and three-dimensional object, by an image reading sensor such as a CCD sensor, and outputs the image data.

In many cases, in an image reader, a reflected light from a reading object is transmitted to a CCD sensor (illuminated by a illumination unit), by moving an optics including a illumination unit and mirrors along a glass plate, while remaining a reading object standstill at a predetermined position in a document holding unit (a transparent glass plate). An illumination unit is made to be able to illuminate the reading width that is a total length of an optional one side (width) of a transparent glass plate. Mirrors are given the length capable of reflecting the reflected light from the reading object illuminated over the reading width, in a predetermined direction over all areas in the reading width.

By moving the optics at a predetermined speed all along the reading length that is the total length of another side (length) orthogonal to the reading width, the reflected lights from all areas of the reading object are transmitted to the CCD sensor. The optics is moved substantially parallel to the glass plate with a predetermined space held between the glass plate. The reflected light from the reading object is transmitted to the CCD sensor through an optical element such as a lens.

Recently, it has been increased to incorporate a line CCD sensor for monochrome images for reading monochrome images at a high speed, in addition to a 3-line CCD sensor for reading color images for exactly reproducing colors.

However, the CCD sensors for color image and monochrome image are different in the spectral sensitivity and wavelength, and choice of illumination lamps is difficult. A lamp common to both color image and monochrome image is available, but the optical condition is not optimum for the two CCD sensors, and the read image quality may be deteriorated.

Thus, it has been proposed to provide two light sources for illuminating color image and monochrome image, and turn on the two light sources simultaneously when reading a color image (Jpn. Pat. Appln. KOKAI Publication No. 2001-144900), or to provide two light sources with different emission colors and block off the light from one light source when a specific color information is unnecessary (Jpn. Pat. Appln. KOKAI Publication No. 8-314117).

BRIEF SUMMARY OF THE INVENTION

It is an object of the present invention is to provide an image reader which can provide an optimum illumination light according to the color of a reading object.

According to an aspect of the present invention, there is provided an image reader comprising a CCD sensor which converts the reflected light generated by illuminating a reading object into an image signal; a table which holds the reading object, and can transmit the light radiated from the opposite side to the reading object; an illumination unit which is provided movably along the table, and can radiate a light with a first wavelength or a light with a second wavelength different from the first wavelength to the reading object placed on the table; an image information detection mechanism which detects that the image information of the reading object placed on the table is suitable for the light with a first wavelength or the light with a second wavelength; and an illumination unit driving mechanism which sets the wavelength of the light radiated from the illumination unit to the reading object to one of the first wavelength and second wavelength, based on the detection result of the image information detection mechanism, and radiates the light from the illumination unit.

According to another aspect of the present invention, there is provided an image reader comprising a CCD sensor which includes a first element to convert an achromatic information to a predetermined electric signal, a second element to convert an optional information of three primary elements of additive color mixture to a predetermined electric signal, a third element to convert a second information of three primary elements of additive color mixture to predetermined electric signal, and a fourth element to convert the remaining information of three primary elements of additive color mixture to a predetermined electric signal, and converts the image light from the reading object to an image signal by the first element or one of the second to fourth elements; a reading object holding table which holds the reading object to be able to radiate a light to the reading object from the opposite side to the reading object; an illumination unit which includes a first light-emitting unit capable of radiating a light with a first wavelength different from the first wavelength, and a second light-emitting unit capable of radiating a light with a second wavelength, and can illuminate the reading object held on the reading object holding table by one of the first light-emitting unit and second light-emitting unit, according to the information characteristic included in the reading object; an image information detection mechanism which detects whether the image information of the reading object on the reading object holding table is suitable for the light with a first wavelength or the light with a second wavelength; an image signal take-in condition setting unit which sets the first element or one of the second to fourth elements of the CCD sensor to take in the information, based on the detection result of the image information detection mechanism; and an illumination unit driving condition setting unit which sets one of the first light-emitting unit and second light-emitting unit to illuminate the reading object, based on the detection result of the image information detection mechanism.

According to still another aspect of the present invention, there is provided an image reading method comprising detecting whether the image information of a reading object is suitable for a light with a first wavelength or a light with a second wavelength; switching a first CCD sensor suitable for the light with a first wavelength and a second CCD sensor suitable for the light with a second wavelength, according to the detected image information; and radiating a light with the set wavelength to a reading object, and converting the image information of the reading object to an image signal by the set CCD sensor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an image reader to which an embodiment of the present invention is applicable, and an example of an image forming apparatus in which the image reader is incorporated, will be explained with reference to the accompanying drawings. An embodiment will be explained taking an example of a digital copying apparatus.

Figure 1:
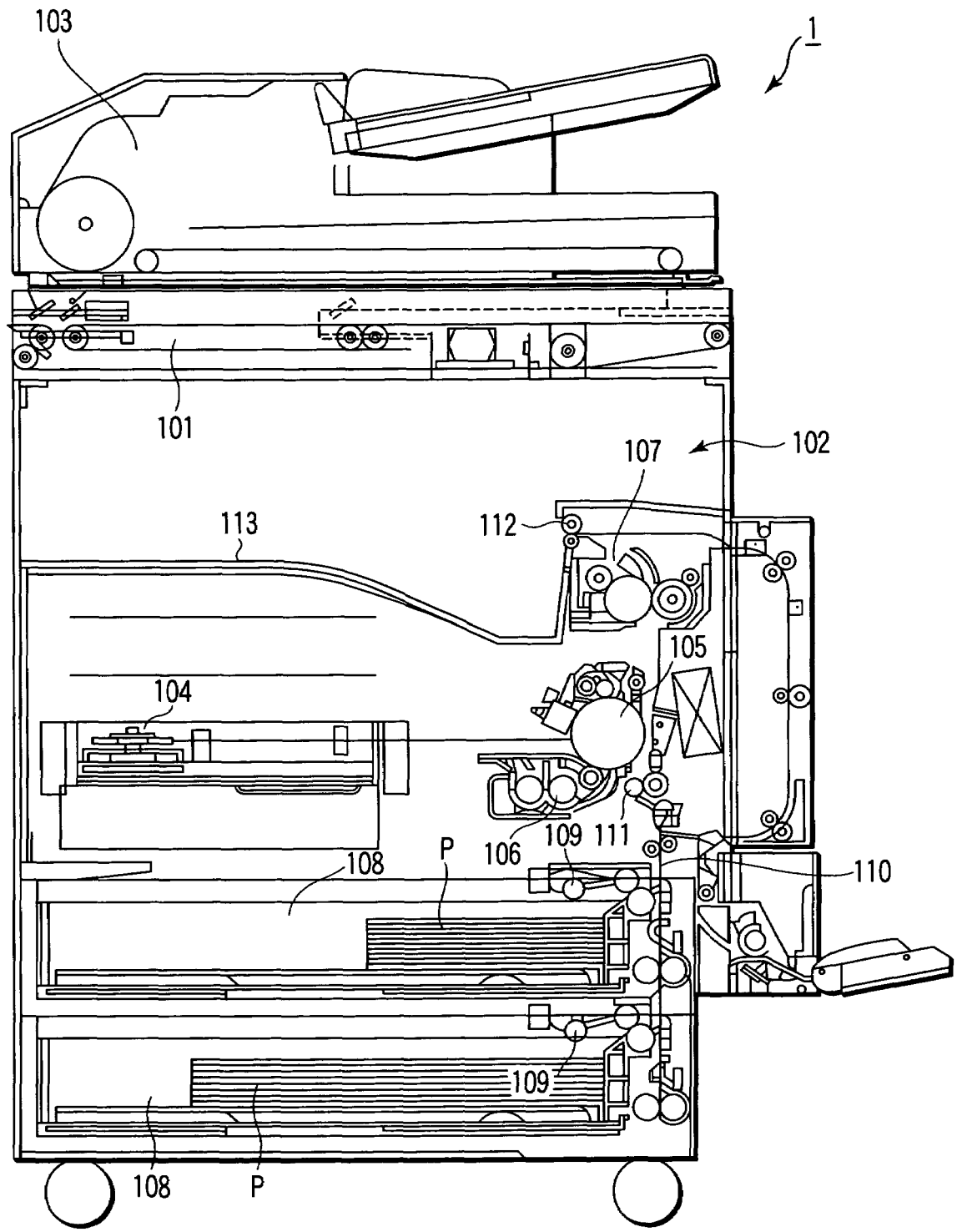
FIG. 1 is a schematic diagram explaining an example of an image forming apparatus, in which an image reader according to the present invention is incorporated.

As shown in FIG. 1, a digital copying apparatus 1 includes a scanner (an image reader) 101 which optically takes in the image information of a copying object (a reading object) O as contrast of light, and an image forming apparatus 102. The scanner 101 is provided integral with an automatic document feeder (ADF) 103, which sequentially exchanges an copying object according to the operation of reading image information from a copying object, when a copying object is sheet-like. The image forming apparatus 102 has an exposing unit 104, a photoconductor drum 105, a developing unit 106 and a fixing unit 107.

In the above-mentioned copying apparatus 1, when image data is supplied from the image reader 101 or an external unit, the exposing unit 104 radiates a laser beam, which is intensity modulated according to the image data, to the surface of the photoconductor drum 105 which is previously electrified to a predetermined potential. Therefore, an electrostatic latent image corresponding to the copying image is formed on the circumference of the photoconductor drum 105.

The not-shown electrostatic latent image formed on the photoconductor drum 105 is developed by the not-shown toner or developer which is selectively supplied to the latent image from the developing unit, and converted to a not-shown developer image or a toner image. The not-shown toner image formed on the surface of the photoconductor drum 105 is transferred to the paper P contained in a sheet cassette 108, at a transfer position opposite to the transfer unit, which is not given a reference numeral.

The paper P is taken out one by one from the sheet cassette 108 by a pickup roller 109, and conveyed on a paper conveying path 110 toward the photoconductor drum 105.

The paper P being conveyed on the paper conveying path 110 is once stopped, so that the position on the paper P of the toner image held by the photoconductor drum 105 is aligned with the position of the image of the reading object by an aligning roller 111, and the timing is matched, and the paper is guided to the transfer position, where the transfer unit not explained in detail faces to the photoconductor drum 105.

The not-shown toner transferred to the paper P is carried to the fixing unit 107 when the paper P is conveyed, and adhered or fixed to the paper.

The paper P, on which the toner (not-shown), that is, the copying image of the reading object or the output image corresponding to the image information supplied from an external unit is fixed by the fixing unit 107, is ejected by a paper eject roller 112 to the space defined between the scanner 101 and the sheet cassette 108, that is, an image output medium holding portion (a tray) 113.

Figure 2:
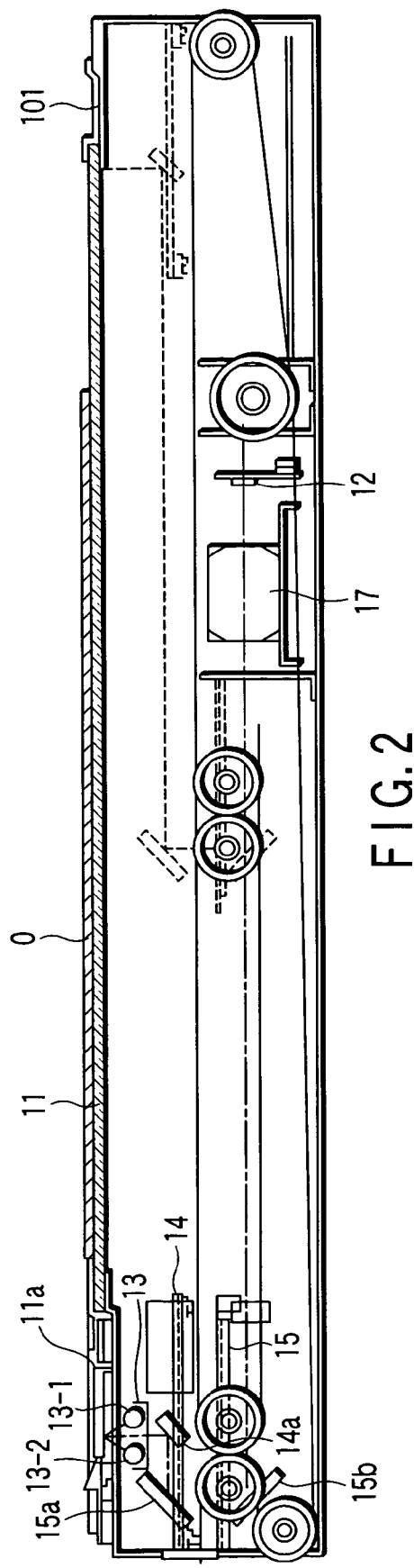
FIG. 2 is a schematic illustration explaining an image reader which can be used integral with the image forming apparatus shown in FIG. 1.

FIG. 2 is a schematic illustration explaining an image reader which is incorporated in the image forming apparatus shown in FIG. 1.

As shown in FIG. 2, the image reader 101 has a document table 11, which is made of optically transparent material represented by a glass, and formed like a transparent plate with the substantially uniform thickness. In one end of the document table 11, a size plate 11a, which indicates a reference position when setting a reading object O (e.g., a sheet-like document) on the document table 11, is provided.

Below the document table 11, at a predetermined position in the image reader, a CCD sensor 12 which converts the image information of a reading object O to an electric signal (an image signal), is provided.

In the space under the document table 11, an illumination unit 13 which illuminates the reading object (document) O set on the document table 11, a first carriage 14 which can move the illumination unit 13 along the document table 11, and a second carriage 15 which guides the image light, explained later, taken out by the first carriage 14, to the CCD sensor 12, are provided.

In the first carriage 14, an image take-out mirror 14a which takes out the reflected light obtained by illuminating the reading object O set on the document table 11 by the illumination light from the illumination unit 13, and reflects it in a predetermined direction, is provided. The image take-out mirror 14a reflects the image light or the image information obtained by converting the image included in the reading object O into the contrast of light, toward the second carriage 15. The first carriage 14 is made a little longer than the length of an optional one side of a maximum readable size reading object O, in the direction of one side (a first direction) of the document table 11. Therefore, the illumination unit 13 and the image take-out mirror 14a are given the lengths a little longer than the length of one side of the document table 11 in the first direction in most cases.

The second carriage 15 is provided with first and second mirrors 15a and 15b which guide the image light reflected from the image take-out mirror 14a toward the CCD sensor 12. A first direction in the second carriage 15 and first/second mirrors 15a/15b is made to a predetermined length shorter than the first carriage 14 (and the illumination unit 13, and the image take-out mirror 14a).

Between the second carriage 15 and the CCD sensor 12, a lens 16 is provided to give a predetermined optical characteristic and an image-forming magnification to the image light, which is reflected by the second mirror 15b and guided to the CCD sensor 12.

Figure 3:
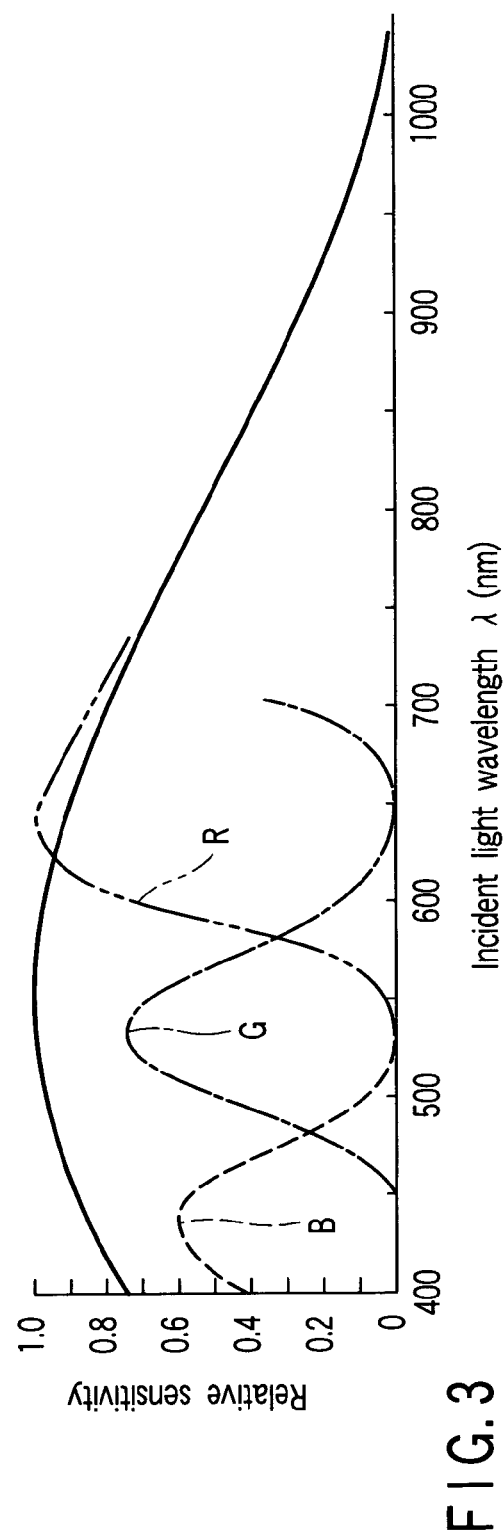
FIG. 3 is a graph explaining the spectral characteristic of an illumination lamp, which is incorporated in the image reader shown in FIG. 2.

The illumination unit 13 has a first lamp 13-1 which is used when the reading object O set on the document table 11 includes a color image, and can radiate a light with a predetermined spectral characteristic described later with reference to FIG. 3, and a second lamp 13-2 which can radiate a light given the spectral characteristic (shown by a solid line in FIG. 3) suitable when the reading object O includes an achromatic color image only. The lights (luminous flux) radiated from the lamps 13-1 and 13-2 are condensed at substantially the same position.

Figure 4:
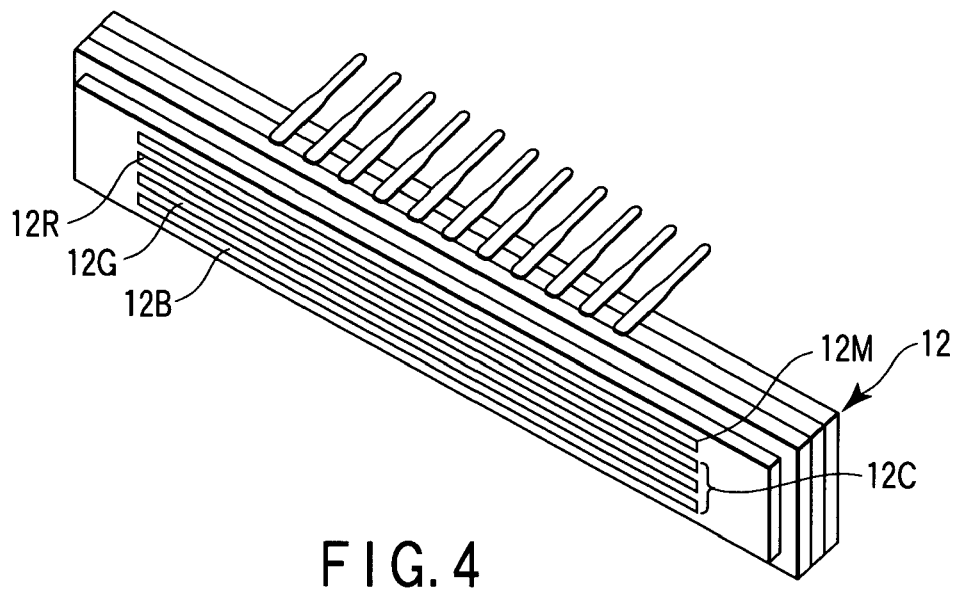
FIG. 4 is a schematic illustration explaining an example of a composite CCD sensor, which is incorporated in the image reader shown in FIG. 2.

The CCD sensor 12 is, as shown in FIG. 4, a composite (4-line) CCD sensor provided with parallel three line sensors 12R, 12G and 12B (hereinafter referred to as 12C) for detecting a color image by resolving into three primary colors R (red), G (green) and B (blue) of additive color mixture, and one line sensor 12M for a monochrome image (achromatic color).

As the feature of the above-mentioned 4-line sensor 12, it is known that higher sharpness is ensured when reading a monochrome image, as compared with the 3-line CCD for color images, and the stability (reproducibility) is higher when the same image is read several times. Since the sensors for monochrome and color images are independently provided, the reading performance of each sensor is equivalent. The outputs of the monochrome sensor 12M and color sensor 12C can be switched by setting a pin, for example, in a very short time without requiring the user to change the setting.

However, it is difficult to use simultaneously the monochrome sensor 12M and color sensor 12C. Further, since the color image sensor 12C is provided with three line sensors equivalent to the monochrome sensor 12M and each of these sensors is provided with a not-shown filter for outputting R, G and B, the sensitivity is ½ to ¼ compared with the monochrome sensor 12M. Further, the wavelength characteristic of each of R, G, and B is not even. This indicates that the color sensor 12C and monochrome sensor 12M show the dependency (different light receiving characteristic) against the spectrum of the light (luminous flux) radiated from an exposing lamp. In the image reader 101 of the present invention, the monochrome sensor and color sensor can be optionally switched according to the discrimination in the well known ACS mode.

Figure 5:
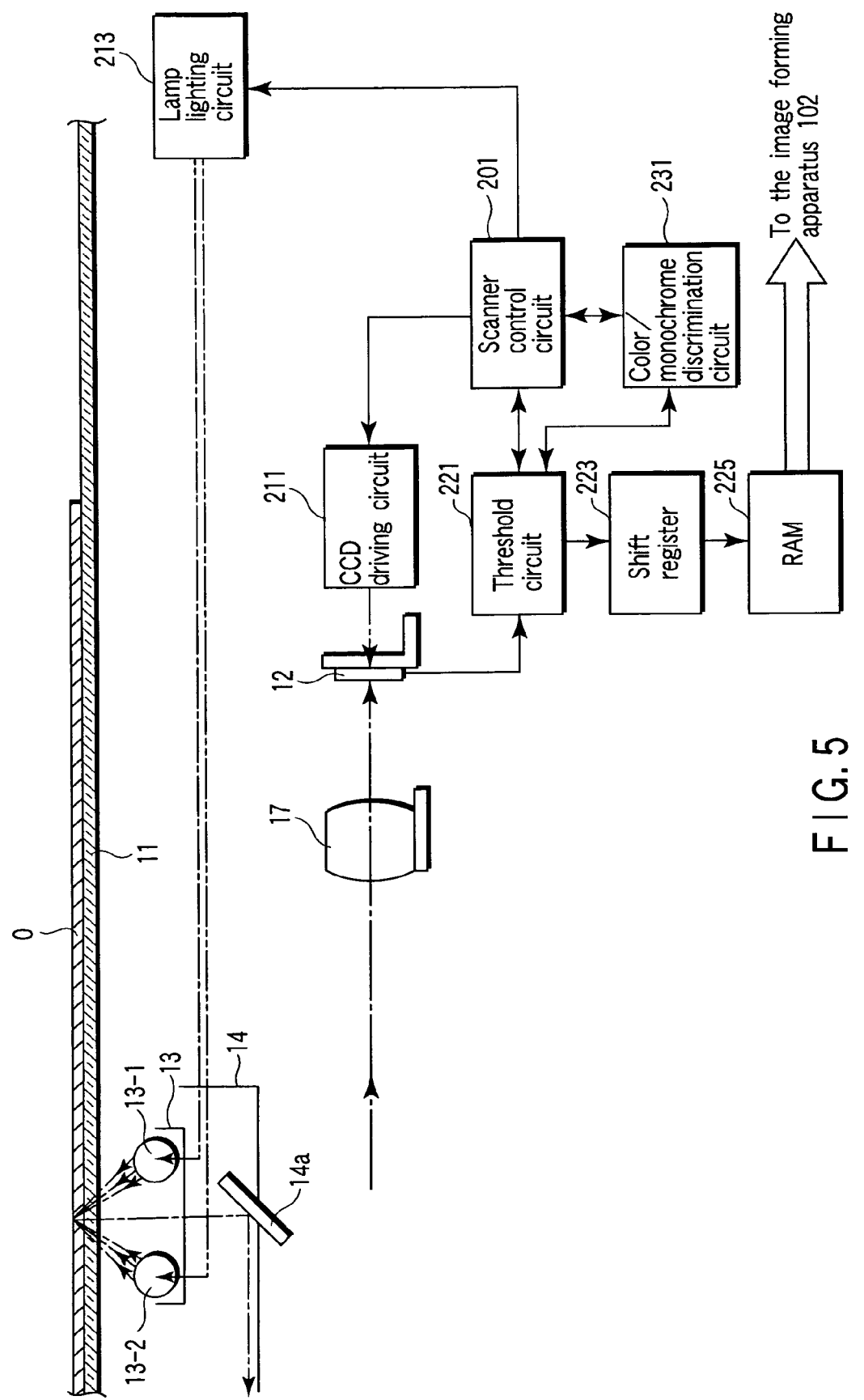
FIG. 5 schematically shows an example of a control unit in the image reader shown in FIGS. 2 to 4.

FIG. 5 shows an example of the control system which can operate the principal elements of the image reader explained with reference to FIG. 2.

As seen from FIG. 5, in the image reader (scanner) 101, either monochrome signal or color signal outputted from the CCD sensor 12 is applied to a threshold circuit 221, and converted from analog to digital. The converted digital signal is stored in a work memory (or an image memory) or RAM 225, line by line at a predetermined time interval, by a shift register 223.

The read output stored in the RAM 225 is outputted to a not-shown work memory of the image forming apparatus 102 or a not-shown external memory, by the control of a scanner control circuit 201.

The CCD sensor 12 permits switching of the color sensor 12C and monochrome sensor 12M, according to the instruction from the scanner circuit 210. The switching is made by the control of a CCD driving circuit (switching circuit) 211, based on the image information included in a reading object (document), according to the operation flow explained later.

Further, the illumination lamps 13-1 and 13-2 which are to be lit by a lamp lighting circuit 213 under the control of the scanner control circuit 201, can also be switched according to the above-mentioned image information. The lamp lighting circuit 213, which lights one of the illumination lamp 13-1 for color images and the illumination lamp 13-2 for monochrome images, may be either the type which inputs a driving signal to a power supply circuit provided independently for each lamp (not explained in detail), or the type which uses a single power supply circuit and changes the output voltage of the power supply circuit.

The illumination lamps 13-1 and 13-2 can switch the image monitor signal outputted from the CCD sensor 12 upon pre-scanning, based on the color/monochrome discrimination signal judge by a color/monochrome discrimination circuit 231. The discriminating operation of the color/monochrome discrimination circuit 231 is well known in ACS (Automatic Color Image Discrimination Mode), and detailed explanation will be omitted here.

Figure 6:
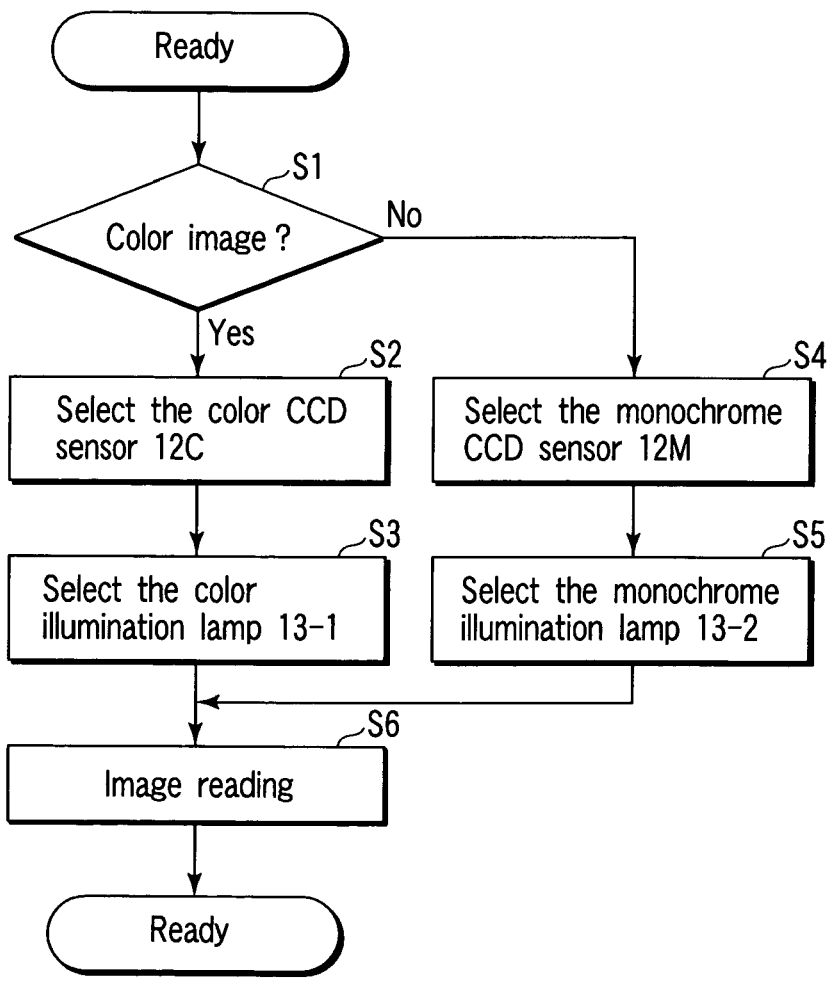
FIG. 6 is a flow chart explaining an example of the control in the image reader shown in FIGS. 2 to 5.

In the above-mentioned image reader 101, as shown in FIG. 6, the reading object O (a copying object) set on the document table 11 through the ADF 103 or by the user is stuck to the document table 11 by an ADF 104.

For example, whether the image information of the document is color or not is decided, in ACS mode, based on the output of the CCD sensor 12 or the result of pre-scanning. (Discriminating the image type, S1)

When it is detected that the image information of the document includes color (S1—Yes), the color CCD sensor 12C is selected as a sensor to read the image information of the reading object O (document), by the control of the CCD switching circuit (sensor control circuit) 211 shown in FIG. 5. (Selecting the reading sensor, S2)

Thereafter, by the scanner control circuit 201 shown in FIG. 5, the lamp to which the lighting circuit (lamp switching circuit) 213 is to output a driving voltage is set (selected), so that a predetermined driving voltage is applied to the lamp (the first lamp 13-1 or second lamp 13-2 of the illumination unit 13) to be lit. (Lighting the color lamp, S3)

Then, though not described in detail, the sensitivities of the line sensors 12R, 12G and 12B of the CCD sensor 12C are calibrated, based on the reference white and black reference prepared in the size plate 11a according to the predetermined image reading routine. Thereafter, the image information of the document set on the document table 11 is read, according to the image reading routine. Namely, when the color illumination lamp 13-1 is lit to be able to emit a light of a predetermined intensity, the reflected light from the rectangular area along the first direction of the document set on the document table 11 is guided to the CCD sensor 12C, and the first and second carriages 14 and 15 are moved along the document table 11 at a predetermined speed, whereby all the image information of the document (the reading object O) is guided to the CCD sensor 12C with a predetermined magnification. (Reading the image, S6)

Contrarily, when it is detected that the image information of the document is not color, that is monochrome (S1—No), the monochrome CCD sensor 12M is selected as a sensor to read the image information of the reading object O (document), by the control of the CCD switching circuit (sensor control circuit) 211, as described above. (Selecting the reading sensor, S4)

Thereafter, by the scanner control circuit 201, the lamp to which the lighting circuit (lamp switching circuit) 213 is to output a driving voltage is set (selected), so that a predetermined driving voltage is applied to the second lamp 13-2 of the illumination unit 13. (Lighting the monochrome lamp, S5)

Then, the sensitivity of the CCD sensor 12M is calibrated, as in the case when the document includes a color image, and the image information of the document on the document table 11 is read at a predetermined speed. (Reading the image, S6)

Of source, the above-mentioned step S1 can be omitted by previously inputting whether the document includes a color image or monochrome image only, by a color mode selector key on a not-shown control panel, instead of the process to detect whether the document is color or monochrome in ACS mode.

As explained hereinbefore, the present invention provides an image reader which can supply an optimum illumination light according to the color of a reading object.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reader comprising:

a CCD sensor which includes a first element to convert an achromatic information to a predetermined electric signal, a second element to convert an optional information of three primary elements of additive color mixture to a predetermined electric signal, a third element to convert a second information of three primary elements of additive color mixture to predetermined electric signal, and a fourth element to convert the remaining information of three elements of additive color mixture to a predetermined electric signal, and converts the image light from the reading object to an image signal by the first primary element or one of the second to fourth elements;

a reading object holding table which holds the reading object to be able to radiate a light to the reading object from the opposite side to the reading object;

an illumination unit which includes a first light-emitting unit capable of radiating a light with a first wavelength, and a second light-emitting unit capable of radiating a light with a second wavelength different from the first wavelength, and can illuminate the reading object held on the reading object holding table by one of the first light-emitting unit and second light-emitting unit, according to the information characteristic included in the reading object;

an image information detection mechanism which detects whether the image information of the reading object on the reading object holding table is suitable for the light with a first wavelength or the light with a second wavelength;

an image signal take-in condition setting unit which sets the first element or one of the second to fourth elements of the CCD sensor to take in the information, based on the detection result of the image information detection mechanism; and an illumination unit driving condition setting unit which sets one of the first light-emitting unit and second light-emitting unit to illuminate the reading object, based on the detection result of the image information detection mechanism.

2. The image reader according to claim 1, wherein the image information detection mechanism determines whether the reading object comprises a monochrome image only or includes a color image.

3. The image reader according to claim 2, wherein the lights from the first light-emitting unit and second light-emitting unit of the illumination unit can illuminate substantially the same area on the reading object holding table.

* * * * *